United States Patent
Wang et al.

(10) Patent No.: US 11,847,797 B2
(45) Date of Patent: Dec. 19, 2023

(54) CALIBRATION METHOD FOR MULTI-DEGREE-OF-FREEDOM MOVABLE VISION SYSTEM

(71) Applicant: SHANGHAI EYEVOLUTION TECHNOLOGY CO., LTD, Shanghai (CN)

(72) Inventors: Kaifang Wang, Shanghai (CN); Dongdong Yang, Shanghai (CN); Xiaolin Zhang, Shanghai (CN)

(73) Assignee: ANHUI EYEVOLUTION TECHNOLOGY CO., LTD., Anhui (CN)

(*) Notice: Subject to any disclaimer, the term of this patent is extended or adjusted under 35 U.S.C. 154(b) by 306 days.

(21) Appl. No.: 17/279,289

(22) PCT Filed: Jul. 18, 2019

(86) PCT No.: PCT/CN2019/096545
§ 371 (c)(1),
(2) Date: Mar. 24, 2021

(87) PCT Pub. No.: WO2020/063058
PCT Pub. Date: Apr. 2, 2020

(65) Prior Publication Data
US 2021/0407135 A1 Dec. 30, 2021

(30) Foreign Application Priority Data
Sep. 28, 2018 (CN) .......................... 201811141453.0

(51) Int. Cl.
*G06F 17/16* (2006.01)
*G06T 7/579* (2017.01)
(Continued)

(52) U.S. Cl.
CPC ................ *G06T 7/85* (2017.01); *G06F 17/16* (2013.01); *G06T 7/44* (2017.01); *G06T 7/579* (2017.01);
(Continued)

(58) Field of Classification Search
None
See application file for complete search history.

(56) References Cited

U.S. PATENT DOCUMENTS 10,475,209 B2 * 11/2019 Shen .......................... G06T 7/80
10,812,778 B1 * 10/2020 Wang ................. G01B 11/0608
(Continued)

FOREIGN PATENT DOCUMENTS

| CN | 201355241 Y | 12/2009 |
| CN | 103759716 A | 4/2014 |

(Continued)

OTHER PUBLICATIONS

Machine Translation of IDS Aug. 12, 2022 Reference CN-104236456-A relied upon. (Year: 2014).*

*Primary Examiner* — Tyler W. Sullivan
(74) *Attorney, Agent, or Firm* — Muncy, Geissler, Olds & Lowe, P.C.

(57) ABSTRACT

In a calibration method for a multi-degree-of-freedom movable vision system, a calibration template is placed in front of a camera component, each degree of freedom of movement of the camera component is rotated, several images including features of the calibration template are recorded using the camera component, position information of each degree of freedom of movement when the corresponding images are acquired is also recorded, and calibration results of the camera component and each degree of freedom of movement are calculated using a calculation component.

(Continued)

The movable vision system comprises the camera component, the calculation component and a control component.

4 Claims, 4 Drawing Sheets

(51) Int. Cl.
*G06T 7/00* (2017.01)
*G06T 7/44* (2017.01)
*G06T 7/80* (2017.01)

(52) U.S. Cl.
CPC ...... *G06T 7/97* (2017.01); *G06T 2207/30208* (2013.01); *G06T 2207/30244* (2013.01)

(56) References Cited

U.S. PATENT DOCUMENTS

| | | | | |
|---|---|---|---|---|
| 10,984,556 | B2* | 4/2021 | Xie | G06T 7/85 |
| 11,014,211 | B2* | 5/2021 | Liu | G01B 21/042 |
| 11,338,441 | B2* | 5/2022 | Shen | B25J 9/1692 |
| 11,348,281 | B1* | 5/2022 | Tang | H04N 13/246 |
| 11,508,091 | B2* | 11/2022 | Atsumi | G06T 7/80 |
| 2006/0088203 | A1 | 4/2006 | Boca et al. | |
| 2010/0165116 | A1 | 7/2010 | Hsieh et al. | |
| 2015/0077543 | A1 | 3/2015 | Kerr et al. | |
| 2018/0126553 | A1* | 5/2018 | Corkum | B25J 9/1697 |
| 2018/0322648 | A1* | 11/2018 | Lu | G06F 18/2411 |
| 2018/0325415 | A1* | 11/2018 | Ehrl | G06T 7/246 |
| 2020/0074683 | A1* | 3/2020 | Shen | G06T 7/80 |
| 2022/0044444 | A1* | 2/2022 | Wang | G06T 7/85 |

FOREIGN PATENT DOCUMENTS

| | | |
|---|---|---|
| CN | 103854291 A | 6/2014 |
| CN | 103854291 A | 6/2014 |
| CN | 104236456 A | 12/2014 |
| CN | 104298244 A | 1/2015 |
| CN | 104354167 A | 2/2015 |
| CN | 104354167 A | 2/2015 |
| CN | 105014667 A | 11/2015 |
| CN | 105234943 A | 1/2016 |
| CN | 105809689 A | 7/2016 |
| CN | 105869150 A | 8/2016 |
| CN | 106156425 A | 11/2016 |
| CN | 106335061 A | 1/2017 |
| CN | 106335061 A | 1/2017 |
| CN | 107081755 A | 8/2017 |
| CN | 107256568 A | 10/2017 |
| CN | 107498558 A | 12/2017 |
| CN | 107498558 A | 12/2017 |
| CN | 107883929 A | 4/2018 |
| CN | 107883929 A | 4/2018 |
| CN | 108447097 A | 8/2018 |
| CN | 109360243 A | 2/2019 |

* cited by examiner

CALIBRATION METHOD FOR MULTI-DEGREE-OF-FREEDOM MOVABLE VISION SYSTEM

TECHNICAL FIELD

The present application relates to a calibration method for a vision system and, in particular, to a calibration method for a multi-degree-of-freedom movable vision system.

BACKGROUND

Multi-degree-of-freedom vision systems have been used in a wide range of applications. Their structural features are vision systems with multiple degrees of freedom of motion, for example, common handheld stability augmentation camera or quad-copter aerial camera usually having three rotational degrees of freedom and including an imaging module that can be controlled to rotate in three degrees of freedom, or pan-tilt-zoom (PTZ) surveillance camera deployed along streets, which has movability in two degrees of freedom and zoom cameras to achieve tracking and large field of view monitoring. In such application scenarios, it is generally unnecessary to know the precise position relationship between the camera and the mounting base. However, for robotic arms having vision modules mounted at the end, it is generally necessary to know the precise position relationship between the camera and the mounting base due to the required precision operations.

For movable vision systems, there are two major concerns in precisely determining the positions of an imaging element and a base. One of the concerns is how to obtain the position change of the imaging element when it moves in any degree of freedom. The other concern is that, due to the limited capabilities of existing mechanical processing and assembly techniques, it is challenging to ensure that mechanical rotation axes for each motional degrees of freedom move exactly as designed while it is also difficult to ensure the relative position between the imaging component and the mechanical rotation axis. All of these have posed significant challenges for direct calculation of the exact positions of an imaging element and a base in a movable vision system.

SUMMARY

In order to overcome problems existed in the prior art, the present application proposes a calibration method for a multi-degree-of-freedom (DOF) movable vision system, which is able to obtain the precise relative position between the imaging element and the base during practical use of the movable vision system by calibrating how the imaging element and the base are affected by movements in each degree of freedom in advance.

In the proposed calibration method for a multi-degree-of-freedom (DOF) movable vision system, the movable vision system includes an imaging component comprising at least one imaging element capable of capturing consecutive images, the imaging component having at least one motional degree of freedom and mounted on a base, each degree of freedom being provided with a position acquisition device capable of acquiring rotation or translation information; a calculation component capable of calculating and processing information of images and information of movement in each motional degree of freedom; and a control component capable of controlling movement in each motional degree of freedom. The calibration method comprises: placing a calibration template in front of the imaging element; driving the imaging element to move in each motional degree of freedom; capturing a number of images containing features of the calibration template by the imaging element and simultaneously recording position information of each motional degree of freedom when capturing corresponding images; and calculating calibration results for the imaging element and each motional degree of freedom by the calculation component.

Optionally, the imaging component may be, for example, a serial of motors coupled in tandem, and have an imaging element mounted on its terminal, so that these tandem motors can impart multiple motional degrees of freedom to the imaging component. For each motional degree of freedom, the imaging component is mainly used to obtain information about the rotation angle. Of course, translation information may also be obtained in the case that the motors are linear ones that output translational power for enabling rotation.

Optionally, the calibration method include, in particular, the steps of: (1) recording position information of each motional degree of freedom at a reference position; (2) placing the calibration template in front of the imaging component, and for each motional degree of freedom, causing several times of changes in a motional degree of freedom, and capturing corresponding images and collecting corresponding position information of the motional degree of freedom; and (3) calculating calibration results for each motional degree of freedom using a calibration algorithm, based on the captured images and the collected position information of each motional degree of freedom.

In practice use, the calibration results (including reference position information and calibration results for each motional degree of freedom) obtained from the calibration process can be used in combination with the acquired position information of the vision system in each motional degree of freedom to obtain rotation and translation relationships of the current position of the imaging element relative to the reference position.

In a particular embodiment, the calibration method of present application includes the following steps:

(1) Determining a reference position and obtaining information thereof: choosing an arbitrary position as the reference position, and recording position information $\{\theta_{Ia}\}$ (a=1 . . . N) of each motional degree of freedom at the reference position, where N represents the number of motional degrees of freedom of the vision system, and a is the serial number of a particular motional degree of freedom, which is numbered according to the connection order of the motional degrees of freedom.

(2) Calibrating motion axes: fixedly placing the calibration template in front of the movable system in such a manner that the imaging component is able to capture complete images of the calibration template; rotating the a-th motion axis several times, and for each rotation, capturing an image $M_{ai}$ by the imaging element connected to the motion axis, and simultaneously recording position information of the motion shaft to obtain $\{M_{ai}, \theta_{ai1}, \ldots, \theta_{aiN}\}$; calculating to obtain rotation and translation transformation matrices $\{R_{aCi}, T_{aCi}\}$ of each captured image relative to the position of the calibration template based on the sequence of images $(M_{a1}, M_{a2}, M_{a3}, \ldots)$ captured in respective rotations and an existing established imaging calibration algorithm (e.g., the Zhang's calibration method), which in turn obtains $\{R_{aCi}, T_{aCi}, \theta_{ai}\}$ (i=1 . . . $P_a$) in combination with the position information of the motion axis recorded when the images are taken, where $P_a$ represents the total number of valid images captured during rotations of the a-th motion axis in the calibration process; and converting rotation angles $\{\theta_{ai1}-\theta_{f1}, \ldots, \theta_{aiN}-\theta_{fN}\}$ (i=1 ... $P_a$) of the motion axis relative to the reference position from the motion axis calibration results into rotation matrices $\{R_{B1i}, \ldots, R_{BNi}\}$ (i=1 ... $P_a$); putting above results into the relationship model $$W_{ai} = \begin{bmatrix} R_{BCa} & T_{BCa} \\ O & 1 \end{bmatrix}^{-1} \begin{bmatrix} R_{Bai} & 0 \\ O & 1 \end{bmatrix} \begin{bmatrix} R_{BCa} & T_{BCa} \\ O & 1 \end{bmatrix}, a = 1 \ldots N, i = 1 \ldots P_a$$

$$W_{1i}W_{2i} \ldots W_{Ni} = \begin{bmatrix} R_{aCi} & T_{aCi} \\ O & 1 \end{bmatrix}, i = 1 \ldots P_a$$

between a rotation axis coordinate system for each motional degree of freedom and the imaging element coordinate system in present application, to get several sets of equations, and solving the optimal solution $\{R_{BCa}, T_{BCa}\}$ (a=1 ... N) for these sets of equations, where $R_{BCa}$, $T_{BCa}$ represent the rotation and translation matrices of the a-th motion axis relative to the imaging element's coordinate system, respectively, N is the number of motional degrees of freedom of the vision system, $R_{Bai}$ denotes the rotation matrices converted from the rotation angles of the a-th motion axis relative to the reference position, $R_{aCi}$, $T_{aCi}$ are rotation and translation transformation matrices of a coordinate system of the i-th image captured when the a-th motion axis is moving relative to the position of the calibration template, respectively, and $P_a$ is the total number of valid images captured during rotations of the a-th motion axis in the calibration process.

(3) Calculating calibration results: obtaining the reference position information $\{\theta_{fa}\}$ (a=1 ... N) and calibration results $\{R_{BCa}, T_{BCa}\}$ (a=1 ... N) for each motion axis from steps (1) and (2), respectively; obtaining position information ($\theta_{p1}, \theta_{p2}, \theta_{p3}, \ldots, \theta_{pN}$) of each motional degree of freedom after movements of the imaging component in the movable system and obtaining rotation angles ($\theta_{p1}-\theta_{f1}$, $\theta_{p2}-\theta_{f2}, \theta_{p3}-\theta_{f3}, \ldots, \theta_{pN}-\theta_{fN}$) of each motional degree of freedom; converting the rotation angles into rotation matrix ($R_{p1}, R_{p2}, R_{p3}, \ldots, R_{pN}$); and putting the rotation matrix into the relationship model (i.e., the equations below) between a rotation axis coordinate system for each motional degree of freedom and the imaging element coordinate system in present application to obtain extrinsic parameters after movements.

$$W_a = \begin{bmatrix} R_{BCa} & T_{BCa} \\ O & 1 \end{bmatrix}^{-1} \begin{bmatrix} R_{pa} & 0 \\ O & 1 \end{bmatrix} \begin{bmatrix} R_{BCa} & T_{BCa} \\ O & 1 \end{bmatrix}, a = 1 \ldots N$$

$$\begin{bmatrix} R' & T' \\ O & 1 \end{bmatrix} = W_1 W_2 \ldots W_N$$

The obtained R' and T' represent rotation and transition matrices of the imaging component relative to the reference position after the movable vision system has moved. $R_{BCa}$, $T_{BCa}$ represent the rotation and translation matrices of the a-th motion axis relative to the imaging element coordinate system. N is the number of motional degrees of freedom of the vision system, and $R_{pa}$ is the rotation matrix converted from the rotation angle of the a-th motion axis relative to the reference position.

In present application, the imaging component is configured to capture consecutive images. The imaging component has at least motional degree of freedom and is secured to the base through each motional degree of freedom. Each motional degree of freedom is provided with a position acquisition device for obtaining rotation or translation information. The imaging component includes at least one imaging element and at least one lens group.

In present application, the calibration template may be a calibration template having extractable invariant features with known information on relative positions. The calibration template, for example, may be various artificial 2D and 3D targets or some stationary natural scenes that are required to be able to extract information of the invariant features through an image processing algorithm as well as acquire relative positional relationships between the invariant features. In practical applications, a precision-machined 3D stereoscopic target or 2D planar target is often used as the calibration template, in order to improve accuracy of the calibration result and decrease difficulty of the calibration process.

In the present application, the calibration results refer to rotation and translation matrices of each rotation axis relative to an optical center of the imaging element. In practical applications, the relative positional relationship (that is, rotation and translation matrices) between the imaging element and the reference position can be calculated from both the calibration results and position information of each motional degree of freedom.

In prior art, due to movements of the camera during operation of the movable system and errors of each axis brought from machining and assembly, it is unable to obtain precise changes of the extrinsic parameters through direct calculation. By contrast, in the calibration method of a multi-degree-of-freedom movable vision system proposed in present application, even in the case that the position of the imaging component has been changed and there are errors in relative positions of each axis and the imaging component due to mechanical machining, assembly and other factors, it is able to calibrate the relative positional relationship between the imaging component and the reference position in real time based on the position recording components provided on each axis. Moreover, accurate rotation and translation of the imaging component between any two positions can be also derived. In the present application, calibration is performed on the basis of the camera calibration algorithm known in the art that is based on a 3D stereoscopic target, the camera calibration algorithm known in the art that is based on a 2D planar target or the like.

Compared with the prior art, the present application offers the following advantages. It allows obtaining precise rotation and translation parameters of an imaging element relative to a reference position through calculation even in the case that the imaging element in the movable system experiences movements. The proposed method has a good performance in real-time calculation. That is, after a single calibration, parameter information of the position change of the imaging element is able to be obtained in real time by calculating position information of each motional degree of freedom. The present application is able to significantly and effectively eliminate issues associated with some inevitable discrepancies between mechanical machining and assembly and theoretical design.

DETAILED DESCRIPTION

The present application will be described in greater detail blow with reference to particular embodiments and the accompanying drawings. For the sake of brevity, when describing the various processes, conditions and experimental methods of those embodiments, some details well known in the art are omitted, and the present application is not particularly limited to such details. A more detailed description of the calibration method for a multi-degree-of-freedom movable vision system according to the present application will be set forth below with reference to FIGS. 1 to 4. It should be noted that the calibration method can be applied to a multi-degree-of-freedom movable vision systems with any number of motional degrees of freedom, and the following embodiments are provided solely for the purpose of exemplification and are not intended to limit the present application in any sense.

Embodiment 1

In Embodiment 1 of the present application, a movable vision system with three degrees of freedom will be described in detail as an example.

Figure 1:
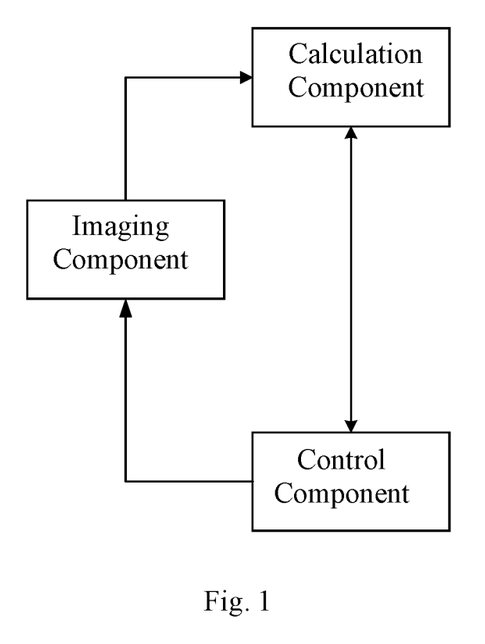
FIG. 1 is a schematic block diagram of a multi-degree-of-freedom (DOF) movable vision system of the present application.

As shown in FIG. 1, the multi-degree-of-freedom (DOF) movable vision system according to the present application includes an imaging component, a calculation component and a control component. The calculation component may be coupled to the imaging component by a signal connection and configured to calibrate influences of movements in each degree of freedom on the imaging component based on images captured by the imaging component in various poses and corresponding pose information. The control component may be coupled to both the imaging component and the calculation component by signal connections and configured to control the imaging component to capture image at various poses and control the calculation component to perform calibration calculation.

Figure 2A:
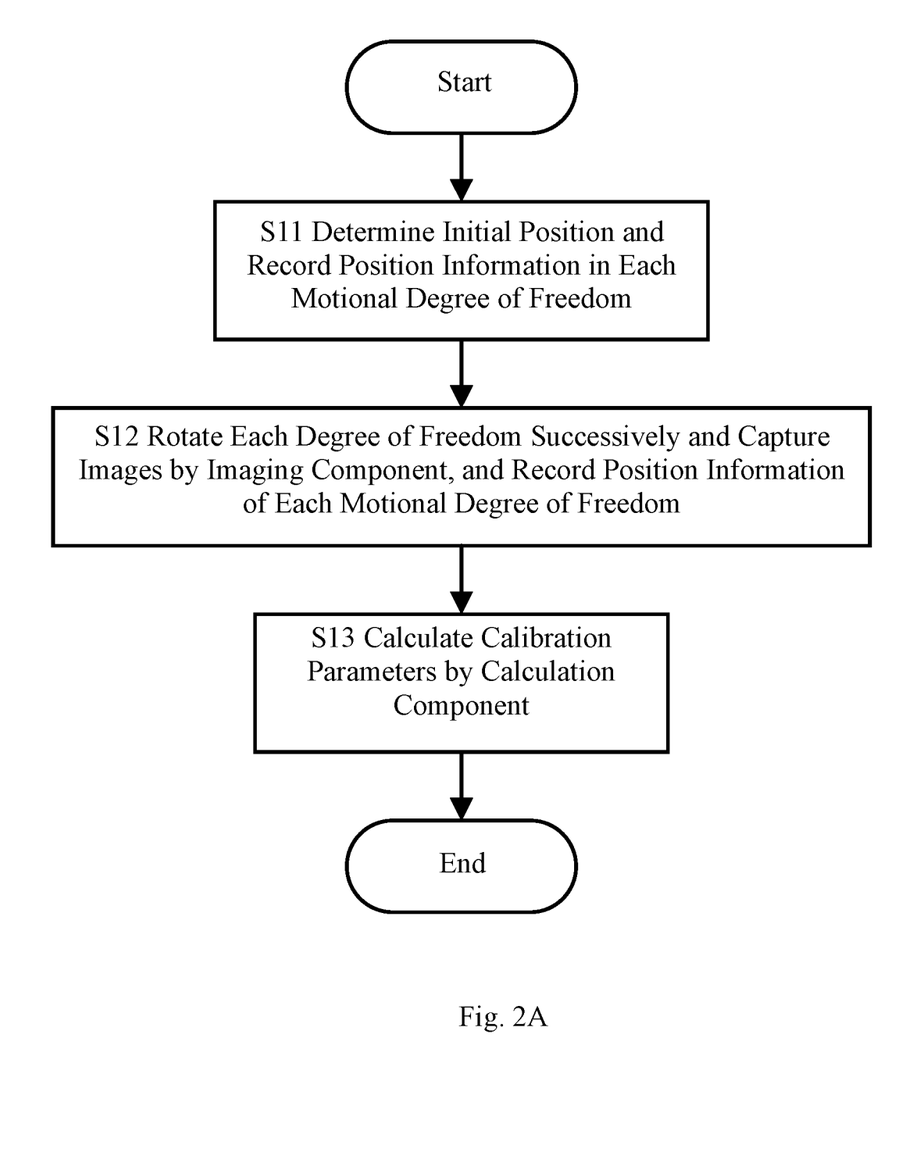
FIG. 2A is a calibration flowchart of a multi-degree-of-freedom (DOF) movable vision system of the present application.

As shown in FIG. 2A, the calibration method of a multi-degree-of-freedom movable vision system in present application mainly includes the flowing calibration steps:

(Step S11) recording position information of each motional degree of freedom at an initial position to determine a reference position;

(Step S12) driving each motional degree of freedom successively and capturing images by the imaging component for each motional degree of freedom; and recording position information of each motional degree of freedom at the time of capturing the corresponding images; and (Step S13) calculating calibration results by the computing component.

Figure 2B:
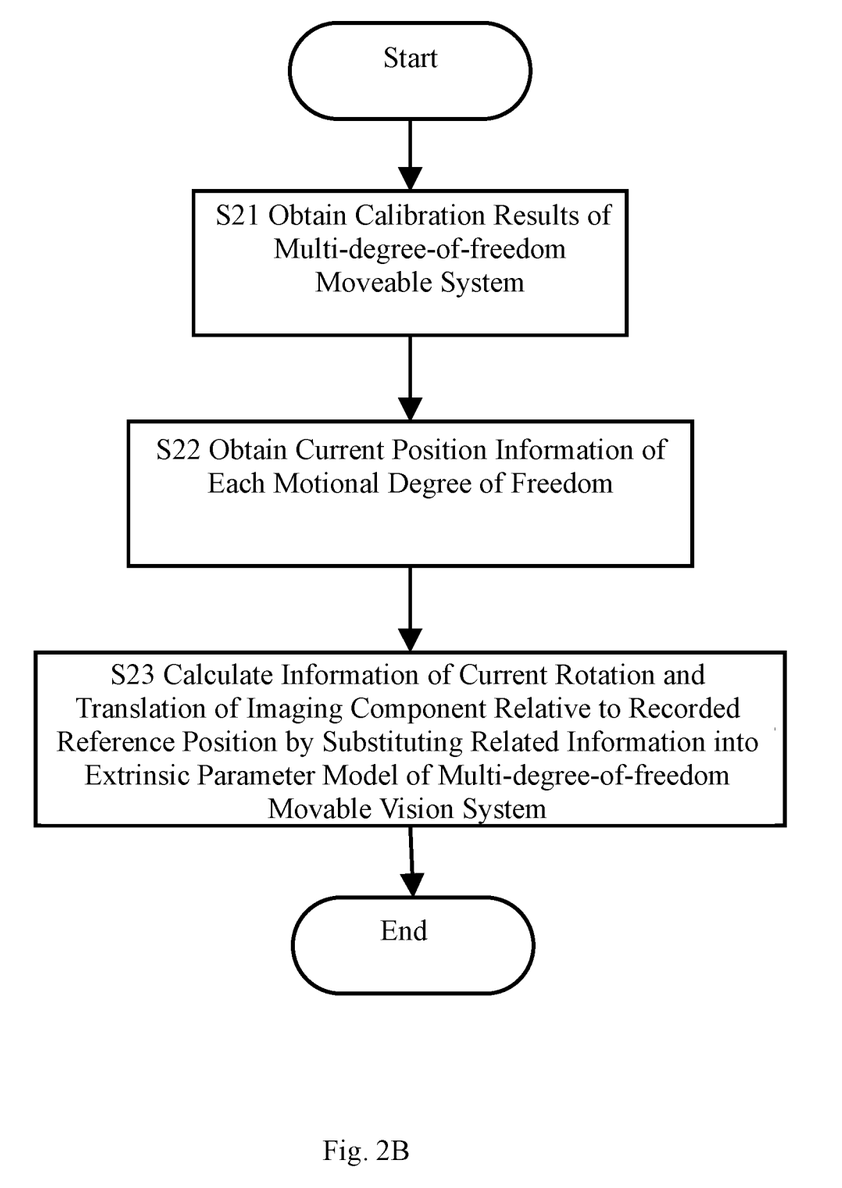
FIG. 2B is a flowchart for real-time calculation of extrinsic parameters of a multi-degree-of-freedom (DOF) movable vision system according to the present application.
Figure 3:
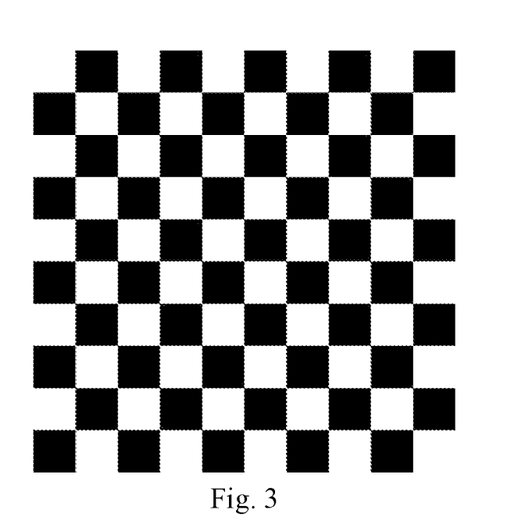
FIG. 3 shows a calibration template of a checkerboard type used in a calibration algorithm of a particular embodiment of the present application.

Once achieving the calibration, a pose of the imaging component relative to the initial position can be precisely calculated based on both the calibration results and position information of each motional degree of freedom. As shown in FIG. 2B, the above calculation process in practical use mainly includes the steps of:

(Step S21) obtaining information on the calibration results of the multi-degree-of-freedom movable vision system;

(Step S22) obtaining information on current position of each motional degree of freedom; and (Step S23) calculating information on current rotation and translation of the imaging component relative to the recorded reference position by substituting the information obtained in Steps S21 and S22 into a model for solving for extrinsic parameters of the movable vision system.

Take the movable vision system having three degrees of freedom as an example. The system has three motional degrees of freedom, which are defined respectively as pitch, yaw and roll motional degrees of freedom. In a three-dimensional rectangular coordinate system, pitch refers to rotation about X axis, yaw referring to rotation about Y axis, roll referring to rotation about Z axis. In this example, movement in the three degrees of freedom may be enabled by three motion elements each for a respective one of the degrees of freedom. In other examples, movement in the three degrees of freedom may also be enabled by one motion element for one of the degrees of freedom and another motion element for the other two degrees of freedom, or by a single motion element for all of the three degrees of freedom. Preferably, the three motion elements are rigidly connected to one another so that movements in one of the degrees of freedom do not affect movements in the other two degrees of freedom. Preferably, the motion element for the pitch degree of freedom may be fixed to a base via a rigid connection, and one or more imaging elements capable of capturing consecutive images may be attached to the motion element for the roll degree of freedom. Movements in above three degrees of freedom are driven by respective motors, each provided with a position recorder for obtaining real-time output position information from the motor. In this example, the output position information from each motor is expressed in the form of an angular value. In particular, the output position information from the motor for driving movements in the roll degree of freedom (also referred to as the "first degree of freedom" hereinafter) is expressed as $\theta 1$, indicating the rotation angle of the spindle of the imaging element relative to the Z axis. The output position information from the motor for driving movement in the yaw degree of freedom (also referred to as the "second degree of freedom" hereinafter) is expressed as $\theta 2$, indicating the rotation angle of the spindle of the imaging element relative to the Y axis. The output position information from the motor for driving movement in the pitch degree of freedom (also referred to as the "third degree of freedom" hereinafter) is expressed as $\theta 3$, indicating the rotation angle of the spindle of the imaging element relative to the X axis.

The calibration method includes the following steps.

1. Acquisition of Reference Position Information

With a calibration template held in front of the imaging in the movable vision system in such a manner that the camera is able to capture complete images of the calibration template, initial position information ($\theta_{f1}$, $\theta_{f2}$, $\theta_{f3}$) of the three motors is recorded at this time as the reference position information.

2. Calibration of Motion Shafts

Each motional degree of freedom is driven successively with the calibration template being kept stationary. That is, when one of the degrees of freedom changes, the other two degrees of freedom do not change. Taking the first (roll) degree of freedom as an example, for each time of rotation of the motion axis (corresponding to the i-th position), Q1 valid images $M_{1ij}$ (j=1, 2, . . . , Q1) are captured by the camera at the corresponding position, and current position information of the motion axis is recorded and get $\{M_{1ij}, \theta_{11i}, \theta_{12i}, \theta_{12i}\}$ (i=1, 2, . . . , P1), where P1 represents the number of rotation of the motion axis in the calibration process of the first degree of freedom. A calculation is then performed based on all sets of images captured at respective positions using a calibration algorithm (e.g., Zhang Zhengyou's calibration algorithm) of the planar checkerboard calibration template shown in FIG. 3, to determine rotation and translation results $\{R_{1Ci}, T_{1Ci}\}$ of the images captured at respective rotation positions relative to the calibration template. Intermediate calibration results $\{R_{1Ci}, T_{1Ci}, \theta_{11i}, \theta_{12i}, \theta_{13i}\}$ (i=1 . . . $P_1$) for the first degree of freedom are then derived from both the above rotation and translation results and the position information of the motion axis recorded at the time of capturing the images. The above process is repeated to yield intermediate calibration results for the second (yaw) and third (pitch) degrees of freedom, and all the intermediate calibration results are integrated into $\{R_{aCi}, T_{aCi}, \theta_{a1i}, \theta_{a2i}, \theta_{a3i}\}$ (i=1 . . . $P_a$, a=1, 2, 3).

Figure 4:
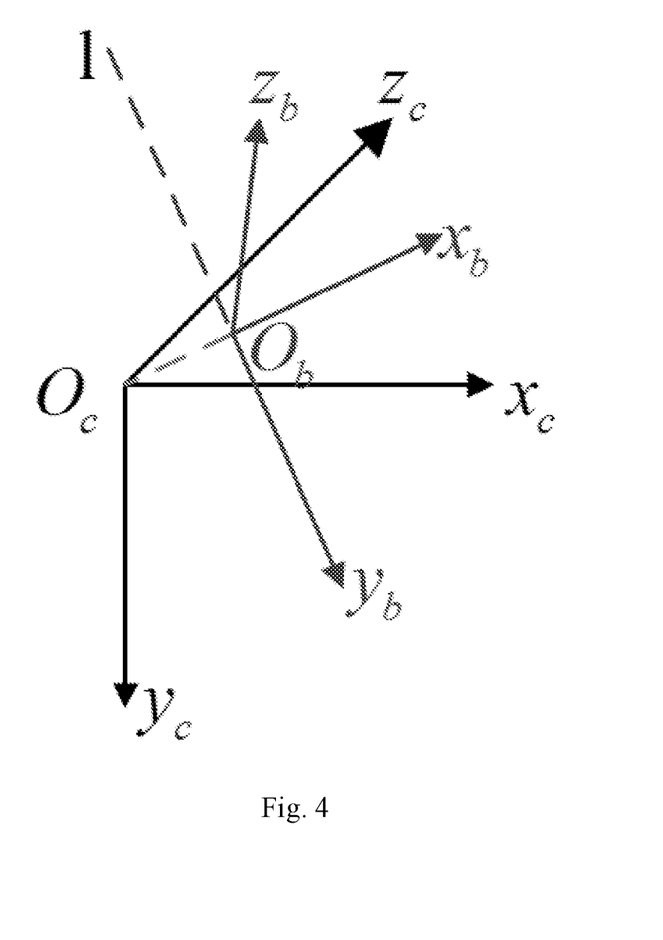
FIG. 4 schematically illustrates the camera coordinate system and the rotation axis coordinate system in each motional degree of freedom according to the present application.

Limited by the mechanical machining techniques, it is difficult to either ensure that the optical center of the movable vision system is positioned on each rotation axis or ensure that each rotation axis is parallel to a corresponding coordinate axis of the camera coordinate system. Therefore, it is necessary to calculate pose variation of the camera coordinate system based on outputs of the rotation axis encoders. For a rigid body, relative positional relationship between the camera spindle and rotation axes of respective degrees of freedom remains unchanged. In order to determine the positional relationship between each rotation axis and the camera coordinate system, a mathematical model is created as shown in FIG. 4. The camera coordinate system (also called the "system C" hereinafter for short) is denoted as $C\{O_c-x_c y_c z_c\}$. The vertical line starting from the optical center $O_c$ of the camera coordinate system is drawn and intersects the rotation axis 1 of the roll degree of freedom at point $O_b$. The perpendicular line extends to get a ray $O_b x_b$. The rotation axis coordinate system B $\{O_b-x_b y_b z_b\}$ (also called the "system B" hereinafter for short) is established, with $O_b$ as an origin, the ray $O_b x_b$ as an x axis, the rotation axis as a y axis, and a z axis determined according to the right-hand rule.

If $O_c O_b$=d (which is a constant determined by the mechanical machining process), then coordinate of $O_c$ in the system B can be represented as $t=(-d, 0, 0)^T$. Let $R_{BC}$ be a rotation matrix from the camera coordinate system C to the rotation axis coordinate system B. For any point P in space, its coordinate PC in the system C and coordinate PB in the system B satisfies the transformation equation $P_B = R_{BC} P_C + t$, expressed in homogeneous coordinates as $$\begin{bmatrix} x_B \\ y_B \\ z_B \\ 1 \end{bmatrix} = \begin{bmatrix} R_{BC} & t \\ O & 1 \end{bmatrix} \begin{bmatrix} x_C \\ y_C \\ z_C \\ 1 \end{bmatrix}, \quad (1)$$

where $T_{BC} = \begin{bmatrix} R_{BC} & t \\ O & 1 \end{bmatrix}$ is the desired calibration result, which is a transformation matrix from the system B to C for any point P in space.

After a rotation about the rotation axis by an angle θ, the rotation axis coordinate system B and the camera coordinate system C become new rotation axis coordinate system B' and new camera coordinate system C'. The rotation about the rotation axis is equivalent to a corresponding rotation of the system B to B' about the $Z_b$ axis by the angle θ. For the same point P, its coordinate $P_B$ in the system B and coordinate $P_{B'}$ in system B' sastisfy:

$$P_{B'} = \begin{bmatrix} R_{B'B} & O \\ O & 1 \end{bmatrix} P_B, \quad (2)$$

where $R_{B'B} = \begin{bmatrix} \cos\theta & 0 & \sin\theta \\ 0 & 1 & 0 \\ -\sin\theta & 0 & \cos\theta \end{bmatrix}$ (this value depends on the angle of rotation).

Similarly, the camera coordinate system rotates by the angle θ into the new camera coordinate system C'. During calibration, the transformation of the camera coordinate system can be calculated using a fixed checkerboard. Assuming a point P is represented by a coordinate $x_w$ in a world coordinate system of the checkerboard, calculated extrinsic parameters of the checkerboard in the systems C and C' will be $T_{CW}$ and $T_{C'W}$, respectively. Since $P_C = T_{CW} x_w$ and $P_{C'} = T_{C'W} x_w$, the following equation can be get:

$$P_{C'} = T_{C'W} T_{CW}^{-1} P_C = T_{C'C} P_C \quad (3)$$

Because of the nature of a rigid body, the positional relationship $T_{BC}$ between the systems B and C remains unchanged in the rotating process. Thus, the same point in the space still satisfies Eqn. (1) in the new coordinate systems B' and C', and the following equation is get.

$$P_{B'} = \begin{bmatrix} R_{BC} & t \\ O & 1 \end{bmatrix} P_{C'} \quad (4)$$

From Eqns. (2), (3) and (4), the following equation is get.

$$\begin{bmatrix} R_{BC} & t \\ O & 1 \end{bmatrix}^{-1} \begin{bmatrix} R_{B'B} & O \\ O & 1 \end{bmatrix} \begin{bmatrix} R_{BC} & t \\ O & 1 \end{bmatrix} = \begin{bmatrix} R_{C'C} & t_{C'C} \\ O & 1 \end{bmatrix} \text{ where } \begin{bmatrix} R_{BC} & t \\ O & 1 \end{bmatrix} \quad (5)$$

is the desired calibration result for the rotation axis, $$\begin{bmatrix} R_{B'B} & O \\ O & 1 \end{bmatrix}$$

is a matrix output from position sensors for each rotation, and $$\begin{bmatrix} R_{C'C} & t_{C'C} \\ O & 1 \end{bmatrix}$$

is a matrix $T_{C'C}$ calculated by the camera for each rotation. $T_{BC}$ is calculated for each rotation to calibrate relationship between the rotation axis coordinate system and the camera coordinate system.

According to the present application, for each degree of freedom, an individual calibration process is performed. For a given set of data $\{R_{aCi}, T_{aCi}, \theta_{a1i}, \theta_{a2i}, \theta_{a3i}\}$ (i=1 ... $P_a$, a=1 ... 3), the motors' rotation angles relative to the reference position can be calculated as $\{\theta_{a1i}-\theta_{f1}, \theta_{a2i}-\theta_{f2}, \theta_{a3i}-\theta_{f3}\}$ (i=1 ... $P_a$, a=1 ... 3) based on this set of data, and the rotation matrices can be calculated as $$\begin{cases} R_{B'B1i} = \begin{bmatrix} \cos(\theta_{a1i}-\theta_{f1}) & -\sin(\theta_{a1i}-\theta_{f1}) & 0 \\ -\sin(\theta_{a1i}-\theta_{f1}) & \cos(\theta_{a1i}-\theta_{f1}) & 0 \\ 0 & 0 & 1 \end{bmatrix} \\ R_{B'B2i} = \begin{bmatrix} 1 & 0 & 0 \\ 0 & \cos(\theta_{a2i}-\theta_{f2}) & -\sin(\theta_{a2i}-\theta_{f2}) \\ 0 & \sin(\theta_{a2i}-\theta_{f2}) & \cos(\theta_{a2i}-\theta_{f2}) \end{bmatrix}, \\ R_{B'B3i} = \begin{bmatrix} \cos(\theta_{a3i}-\theta_{f3}) & 0 & \sin(\theta_{a3i}-\theta_{f3}) \\ 0 & 1 & 0 \\ -\sin(\theta_{a3i}-\theta_{f3}) & 0 & \cos(\theta_{a3i}-\theta_{f3}) \end{bmatrix} \end{cases} \quad (6)$$

$i = 1 \ldots P_a, a = 1 \ldots 3$

When substituting this into Eqn. (5), the following set of equations can be get:

$$W_{ai} = \begin{bmatrix} R_{BCa} & T_{BCa} \\ O & 1 \end{bmatrix}^{-1} \begin{bmatrix} R_{B'Bai} & 0 \\ O & 1 \end{bmatrix} \begin{bmatrix} R_{BCa} & T_{BCa} \\ O & 1 \end{bmatrix}, a = 1 \ldots 3, i = 1 \ldots P \quad (7)$$

$$W_{1i}W_{2i}W_{3i} = \begin{bmatrix} R_a & T_a \\ O & 1 \end{bmatrix}, i = 1 \ldots P_a.$$

P sets of equations can be obtained when all the data is substituted into Eqn. (7), and an optimal solution $\{R_{BCa}, T_{BCa}\}$ (a=1 ... 3) can be obtained by solving those equations.

3. Calculation of Real-Time Calibration Results

The overall calibration results include the reference position information ($\theta_{f1}, \theta_{f2}, \theta_{f3}$) and the motion axis calibration results $\{R_{BCa}, T_{BCa}\}$ (a=1 ... 3). Position information ($\theta_{p1}, \theta_{p2}, \theta_{p3}$) of the three motional degrees of freedom is obtained after the imaging component of the movable vision system moves. Rotation angles of the three degrees of freedom are obtained as ($\theta_{p1}-\theta_{f1}, \theta_{p2}-\theta_{f2}, \theta_{p3}-\theta_{f3}$), which are then converted into rotation matrices ($R_{p1}, R_{p2}, R_{p3}$) and fed into the model. As a result, post-movement extrinsic parameters of the movable vision system relative to the reference camera position are obtained as $$W_a = \begin{bmatrix} R_{BCa} & T_{BCa} \\ O & 1 \end{bmatrix}^{-1} \begin{bmatrix} R_{pa} & 0 \\ O & 1 \end{bmatrix} \begin{bmatrix} R_{BCa} & T_{BCa} \\ O & 1 \end{bmatrix}, a = 1 \ldots 3$$

$$\begin{bmatrix} R' & T' \\ O & 1 \end{bmatrix} = W_1 W_2 W_3.$$

The obtained R' and T' represent rotation and transition matrices of the camera relative to the reference position after the three-degree-of-freedom movable vision system has moved.

The calibration method of a movable vision system proposed in the present application is not limited to the foregoing embodiments, and various variations and modifications can be made without departing from the principles of the present application. The scope of the present application is not limited to the embodiments disclosed hereinabove. Rather, it embraces any and all changes or advantages that can be devised by those skilled in the art without departing from the spirit and scope of conception of this application. Thus, the protection scope of present application is defined by the appended claims.

What is claimed is:

1. A calibration method of a multi-degree-of-freedom movable vision system, wherein the multi-degree-of-freedom movable vision system comprises:

an imaging device comprising at least one camera each capable of capturing a sequence of consecutive images, the imaging device having at least one rotatable axis and mounted on a base, wherein each rotatable axis is provided with a position acquisition sensor capable of acquiring rotation or translation information;

a calculation circuit capable of calculating and processing information of images and information of movement in each rotatable axis; and a control circuitry capable of controlling movement in each rotatable axis, and wherein the calibration method comprises:

1) Obtaining a position information of each rotatable axis at a reference position;

2) fixedly placing a calibration template, rotating an a-th rotatable axis for multiple times, and for each rotation: capturing an image by the camera, and simultaneously recording a position information of the rotatable axis by the position acquisition sensor, where a=1 ... N, a is a serial number of the rotatable axis, and N is a number of the rotatable axis;

3) Calculating rotation and translation transformation matrices of the camera of each captured image relative to the camera at the reference position through a calibration algorithm based on the sequence of images obtained by the multiple rotations; and 4) converting rotation angles of the rotatable axis relative to the reference position into rotation matrices, putting the rotation matrices into a relationship model between a rotatable axis coordinate system and a camera coordinate system to obtain calibration results, wherein the calibration results comprise rotation and translation matrices for each rotatable axis relative to the camera coordinate system.

2. The calibration method of a multi-degree-of-freedom movable vision system according to claim 1, wherein the calibration template includes one of a natural static scene and an artificial standard target, wherein the natural static scene when serving as the calibration template provides invariant features and known information of position relationship between the features, and wherein the artificial standard target includes at least one of a two-dimensional (2D) planar target and a three-dimensional (3D) stereoscopic target.

3. The calibration method of a multi-degree-of-freedom movable vision system according to claim 1, wherein a relative positional relationship between a current position of the camera and the reference position is calculated from the calibration results and a current position information of the camera in each rotatable axis and the relationship model, and wherein the relative positional relationship is expressed by rotation and translation matrices.

4. The calibration method of a multi-degree-of-freedom movable vision system according to claim 3, wherein the relationship model is $$W_a = \begin{bmatrix} R_{BCa} & T_{BCa} \\ 0 & 1 \end{bmatrix}^{-1} \begin{bmatrix} R_{pa} & 0 \\ 0 & 1 \end{bmatrix} \begin{bmatrix} R_{BCa} & T_{BCa} \\ 0 & 1 \end{bmatrix}, a = 1 \dots N$$

$$\begin{bmatrix} R' & T' \\ 0 & 1 \end{bmatrix} = W_1 W_2 * \dots * W_N$$

where R' and T" are rotation and translation matrices of the current position of the camera relative to the reference position, respectively, $R_{BCa}$ and $T_{BCa}$ are rotation and translation matrices of the a-th rotatable axis relative to the camera coordinate system, N is a number of rotatable axis of the movable vision system, and $R_{pa}$, is a rotation matrix converted from a rotation angle of the a-th rotatable axis relative to the reference position.

* * * * *